United States Patent Office 3,149,130
Patented Sept. 15, 1964

3,149,130
PROCESS FOR PREPARING 2,3-DIHYDRO-PARA-DIOXIN
Howard R. Guest, Charleston, and Ben W. Kiff, Ona, W. Va., assignors to Union Carbide Corporation, a corporation of New York
No Drawing. Filed May 13, 1960, Ser. No. 28,825
8 Claims. (Cl. 260—340.6)

This invention relates to a new and improved process for preparing 2,3-dihydro-para-dioxin. More particularly, this invention relates to the preparation of 2,3-dihydro-para-dioxin by the simultaneous dehydrogenation and dehydration of ethylene glycol in the vapor phase. This invention also relates to the polymerization of 2,3-dihydro-para-dioxin.

The simultaneous dehydrogenation and dehydration of ethylene glycol to 2,3-dihydro-para-dioxin according to the process of the instant invention can be achieved by contacting vapors of ethylene glycol with a suitable catalyst, either alone or in the presence of an inert diluent, such as nitrogen. Since ethylene glycol is a low cost, commercially available material, the process of the instant invention provides a convenient and economical method of preparing 2,3-dihydro-para-dioxin. The preparation of 2,3-dihydro-para-dioxin can be illustrated by the following equation:

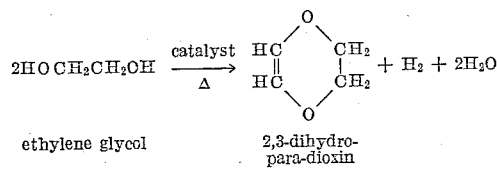

The simultaneous dehydrogenation and dehydration of ethylene glycol to 2,3-dihydro-para-dioxin according to the process of the instant invention can be conveniently achieved by passing hot ethylene glycol vapors over a suitable catalyst. The contact time necessary will, of course, vary with the temperature, but is usually from 2 to 30 seconds, preferably from 6 to 10 seconds, in duration. By "contact time" is meant the period of time that a unit volume of the reacting gas is in the catalyst zone under the conditions of the reaction. If desired, an inert gas, such as nitrogen, can be employed as a diluent. The effluent reaction products, with the exception of the hydrogen formed, may be condensed and treated to separate the desired product by any suitable means, such as by fractional distillation.

The catalyst employed in effecting the simultaneous dehydrogenation and dehydration of ethylene glycol vapors to 2,3-dihydro-para-dioxin according to the process of the instant invention, is an oxide of a metal selected from the group consisting of platinum, palladium, rhodium and ruthenium, such as PtO, PtO$_3$, PtO$_2$, Pt$_3$O$_4$, PdO, PdO$_2$, Pd$_2$O, RhO, RhO$_2$, Rh$_2$O$_2$, RhO$_3$, RuO$_4$, RuO$_2$, Ru$_2$O$_3$, Ru$_2$O$_5$, and Ru$_4$O$_9$. The catalyst can be employed either alone or supported on a carrier, such as carbon, silica or alumina. A carrier having a lower surface area and larger particle size is a better support than one having an extremely high surface area and small particle size. A support of sufficient size as to be retained on an 8-mesh screen is preferably utilized, but any support of sufficient size to be retained on a 20-mesh screen is suitable. When employing the metal oxide catalyst on a carrier, the supported catalyst can be prepared by any method known in the art, for example, by direct mixing of solid components, impregnation, etc. The amount of metal oxide catalyst employed in such supported catalysts can vary from as low as about 0.1 percent by weight to as high as about 10 percent by weight, preferably from 0.1 percent by weight to 1 percent by weight, of the overall weight of supported catalyst.

The simultaneous dehydrogenation and dehydration of ethylene glycol to 2,3-dihydro-para-dioxin according to the process of the instant invention can be effected at temperatures ranging from as low as about 200° C. to as high as about 400° C., but is preferably effected at temperatures ranging from 225° C. to 350° C.

Atmospheric pressure is usually employed in effecting the simultaneous dehydrogenation and dehydration of ethylene glycol to 2,3-dihydro-para-dioxin according to the process of the instant invention. However, pressures both above and below atmospheric pressure, for example pressures ranging from as low as about 100 mm. Hg to as high as about 2 atmospheres, can also be employed.

It has also been discovered that 2,3-dihydro-para-dioxin can be readily homopolymerized, or copolymerized with vinyl-containing organic compounds to produce various polymeric materials. Illustrative of the vinyl-containing organic compounds which can be copolymerized with 2,3-dihydro-para-dioxin are such compounds as styrene, butadiene, methyl acrylate, methyl methacrylate, vinyl acetate, vinyl chloride, vinylidene chloride, acrylonitrile, methacrylonitrile, vinylidene cyanide, acrylamide, methacrylamide, vinyl methyl ether and the like. The polymeric materials produced by polymerizing 2,3-dihydro-para-dioxin are useful as viscosity improvers for motor oils.

Polymerization of 2,3-dihydro-para-dioxin by the process of the instant invention can be effected by means of heat-light, or a suitable vinyl polymerization catalyst, such as a peroxide or azo compound. Preferably polymerization is effected by heating in the presence of a polymerization catalyst to shorten the reaction time. Temperatures ranging from as low as 30° C. to as high as 100° C. are generally effective for this purpose. Among the peroxides which can be employed as catalysts may be mentioned hydrogen peroxide, barium peroxide, magnesium peroxide, diethyl peroxide, di-tertiary-butyl peroxide, distearyl peroxide, diacetyl peroxide, distearoyl peroxide and acetyl benzoyl peroxide. Specific examples of the azo compounds which can be employed include α,α'-azo-bis-isobutyronitrile and 2,2'-dicyanoazobenzene.

The polymerization of 2,3-dihydro-para-dioxin can also be effected in an emulsion or in a solution of the starting monomers. Good results are obtained by effecting polymerization in an inert liquid diluent such as acetonitrile, benzene, toluene, xylene and the like.

The following examples are set forth for purposes of illustration so that those skilled in the art may better understand this invention, and it should be understood that they are not to be construed as limiting this invention in any manner.

EXAMPLE I

A vertical tubular reactor 3½ feet in length and one inch in diameter, equipped with inlet and exhaust tubes, was filled to a height of 15 inches with 200 ml. of a supported catalyst composition containing 0.2 percent by weight of palladium oxide on 4 by 8 mesh charcoal. A two-foot section of the reactor above the catalyst was then filled with 2 by 4 mesh Aloxite (aluminum oxide made by fusing materials high in alumina, such as bauxite, manufactured by the Carborundum Co., Niagara Falls, N.Y.). The reactor was encased with an electrically-heated jacket containing Dowtherm (a eutectic mixture of diphenyl and diphenyl oxide, manufactured by the Dow Chemical Co., Midland, Mich.), which served as a heat transfer medium. The reactor was maintained at a temperature of 310–320° C. while liquid ethylene glycol was fed through the inlet tube at the top of the reactor at the rate of 120 grams per hour.

The liquid ethylene glycol was vaporized in the Aloxite-filled section of the reactor and the vapors were passed through the catalyst-filled section. The vapors which emerged from the exhaust tube were then passed through a water-cooled condenser, and the condensed effluent was collected. The reaction was allowed to proceed for 6 hours, during which time a total of 745 grams of ethylene glycol were fed through the reactor. At the end of this time, the condensed effluent was distilled and 93 grams of 2,3-dihydro-para-dioxin boiling at a temperature of 93° C. were collected. This represented a yield of about 18 percent. From the amount of unreacted enthylene glycol recovered the efficiency was 76 percent. The 2,3-dihydro-para-dioxin had a specific gravity of 1.084 at 20° C. and a refractive index of 1.4320 at 30° C.

EXAMPLE II

To the reactor described in Example I were charged 225 ml. of a supported catalyst composition containing 1.0 percent by weight of platinum oxide on 4 by 8 mesh granular charcoal. A two-foot section of the reactor above the catalyst was then filled with 2 by 4 mesh Aloxite. The reactor was maintained at a temperature of 240–245° C. while liquid ethylene glycol was fed through the inlet tube at the top of the reactor at the rate of 120 grams per hour. The liquid ethylene glycol was vaporized in the Aloxite-filled section of the reactor and the vapors were passed through the catalyst-filled section. The vapors which emerged from the exhaust tube were then passed through a water-cooled condenser, and the condensed effluent was collected and distilled. The yield of 2,3-dihydro-para-dioxin was about 6.5 percent of theoretical. The efficiency was 70 percent.

EXAMPLE III

*Copolymerization of 2,3-Dihydro-para-dioxin With Acrylonitrile*

To a Pyrex polymerization tube were charged 7.0 grams of acrylonitrile, 3.0 grams of 2,3-dihydro-para-dioxin and 0.1 gram of azo-bis-isobutyronitrile. The tube was purged with nitrogen, and then sealed and rocked in a water bath maintained at a temperature of 50° C. for 65 minutes. The recovered copolymer was composed of about 93.0 percent by weight of combined acrylonitrile and 7.0 percent by weight of combined 2,3-dihydro-para-dioxin, and had a reduced viscosity of 4.28 in dimethyl formamide.

Reduced viscosity ($I_R$) is a measure of the molecular weight of a polymer, and can be defined by the equation:

$$I_R = \frac{\Delta N}{\frac{N_0}{C}}$$

wherein $\Delta N$ is the difference in seconds between the flow-time of a solution of polymer through a capillary viscometer and the flow-time of the solvent, $N_0$ represents the flow-time of the solvent, and $C$ is the concentration of polymer in said solution in grams per 100 ml. of solution. Measurements were made at 30° C. using dimethyl formamide as solvent, and a solution of 0.02 gram of polymer per 100 ml. of solution.

EXAMPLE IV

*Copolymerization of 2,3-Dihydro-para-dioxin With Vinylidene Chloride*

To a Pyrex polymerization tube were charged 8 grams of vinylidene chloride, 2 grams of 2,3-dihydro-para-dioxin and 0.1 gram of azo-bis-isobutyronitrile. The tube was purged with nitrogen, and then sealed and rocked in a water bath maintained at a temperature of 50° C. for 2½ hours. The recovered copolymer weighed 1.5 grams. The copolymer was composed of about 94.2 percent by weight of combined vinylidene chloride and 5.8 percent by weight of combined 2,3-dihydro-para-dioxin, and had a reduced viscosity of 0.01 in cyclohexanone. The reduced viscosity was determined at 30° C. employing a solution of 0.02 gram of polymer per 100 ml. of cyclohexanone.

Homopolymers of 2,3-dihydro-para-dioxin are produced in a manner similar to the procedure of Examples III and IV.

Unless otherwise specified, all parts and percentages, as used throughout this specification, are by weight.

What is claimed is:

1. A process for producing 2,3-dihydro-para-dioxin which comprises contacting ethylene glycol vapor with an oxide of a metal selected from the group consisting of platinum, palladium, rhodium and ruthenium as catalyst.

2. A process for producing 2,3-dihydro-para-dioxin which comprises contacting ethylene glycol vapor with an oxide of a metal selected from the group consisting of platinum, palladium, rhodium and ruthenium supported on a carrier as catalyst.

3. A process for producing 2,3-dihydro-para-dioxin which comprises contacting ethylene glycol vapor with an oxide of a metal selected from the group consisting of platinum, palladium, rhodium and ruthenium supported on a carrier selected from the group consisting of carbon, silica and alumina as catalyst.

4. A process for producing 2,3-dihydro-para-dioxin which comprises contacting ethylene glycol vapor with an oxide of a metal selected from the group consisting of platinum, palladium, rhodium and ruthenium as a catalyst at a temperature of from 200° C. to 400° C.

5. A process for producing 2,3-dihydro-para-dioxin which comprises contacting ethylene glycol vapor with an oxide of a metal selected from the group consisting of platinum, palladium, rhodium and ruthenium supported on a carrier as catalyst at a temperature of from 200° C. to 400° C.

6. A process for producing 2,3-dihydro-para-dioxin which comprises contacting ethylene glycol vapor with an oxide of a metal selected from the group consisting of platinum, palladium, rhodium and ruthenium supported on a carrier selected from the group consisting of carbon, silica and alumina as catalyst at a temperature of from 200° C. to 400° C.

7. A process for producing 2,3-dihydro-para-dioxin which comprises contacting ethylene glycol vapor with palladium oxide supported on carbon as catalyst at a temperature of from 200° C. to 400° C.

8. A process for producing 2,3-dihydro-para-dioxin which comprises contacting ethylene glycol vapor with platinum oxide supported on carbon as catalyst at a temperature of from 200° C. to 400° C.

References Cited in the file of this patent

UNITED STATES PATENTS

| | | |
|---|---|---|
| 1,681,861 | Knorr et al. | Aug. 21, 1928 |
| 2,072,101 | Dreyfus | Mar. 2, 1937 |
| 2,142,033 | McNamee et al. | Dec. 27, 1938 |
| 2,382,640 | Kenyon et al. | Aug. 14, 1945 |
| 2,414,982 | Smedley | Jan. 28, 1947 |
| 2,713,573 | Schildknecht | July 19, 1955 |
| 2,807,629 | Bell | Sept. 24, 1957 |